United States Patent [19]
Niida et al.

[11] Patent Number: 6,002,837
[45] Date of Patent: Dec. 14, 1999

[54] IMAGE REPRODUCING APPARATUS REPRODUCING CODED IMAGE SIGNALS WHILE CONCEALING DATA WHICH CANNOT BE DECODED

[75] Inventors: Mitsuo Niida, Kawasaki; Shingo Ikeda, Tama, both of Japan

[73] Assignee: Canon Kabushiki Kaisha, Tokyo, Japan

[21] Appl. No.: 08/959,297

[22] Filed: Oct. 24, 1997

Related U.S. Application Data

[63] Continuation of application No. 08/835,353, Apr. 7, 1997, abandoned, which is a continuation of application No. 08/250,487, May 27, 1994, abandoned.

[30] Foreign Application Priority Data

Jun. 30, 1993 [JP] Japan ..................... 5-161958
Jul. 5, 1993 [JP] Japan ..................... 5-165626

[51] Int. Cl.$^6$ ..................................... H04N 5/92
[52] U.S. Cl. ........................ 386/113; 386/116; 386/124
[58] Field of Search ............... 386/2–3, 13, 40, 386/21, 47–51, 58, 90, 109, 111, 112, 113, 116, 126; 360/8, 53, 32; 348/607, 616, 617, 624; 371/30–31, 37.01, 38.01, 39.01, 40.14, 40.15, 40.16; H04N 5/76, 5/94, 9/88, 9/79, 5/92

[56] References Cited

U.S. PATENT DOCUMENTS

| | | | |
|---|---|---|---|
| 5,103,349 | 4/1992 | Sochor | 358/336 |
| 5,392,129 | 2/1995 | Ohtaka et al. | 358/336 |
| 5,473,443 | 12/1995 | Wilkinson | 358/336 |

*Primary Examiner*—Thai Tran
*Attorney, Agent, or Firm*—Fitzpatrick, Cella, Harper & Scinto

[57] ABSTRACT

An image reproducing apparatus includes a reproduction unit to reproduce an image signal corresponding to a picture having a plurality of image blocks that each include a plurality of pixels. The image signal includes coded image data for each of the image blocks. A decoding nit is provided to decode the image signal reproduced by the reproduction unit. In addition, a replacement unit is provided to replace with a predetermined signal, a portion of the image data for blocks located near an undecodable block, the undecodable block being a block corresponding to image data that cannot be decoded by the decoding unit.

30 Claims, 10 Drawing Sheets

IMAGE REPRODUCING APPARATUS REPRODUCING CODED IMAGE SIGNALS WHILE CONCEALING DATA WHICH CANNOT BE DECODED

This application is a continuation of application Ser. No. 08/835,353, filed Apr. 7, 1997, which is a continuation of application Ser. No. 08/250,487, filed May 27, 1994, both now abandoned.

BACKGROUND OF THE INVENTION

1. Field of the Invention

The present invention relates to a reproducing apparatus for reproducing image signals, and more particularly, to an image reproducing apparatus for reproducing image signals by decoding high-efficiency coded image signals and by concealing the data which cannot be decoded.

2. Description of the Related Art

An example of a conventional image reproducing apparatus of the above-described is a digital VTR (video tape recorder) which digitizes an image signal and records or reproduces the digital image signal. The digital VTR employs the band compression coding technique to compress and record or reproduce image data.

Orthogonal transform coding is known as a technique for high-efficiency coding of image signals. In a method employing orthogonal transform coding, after an image signal is divided into blocks each consisting of a plurality of pixels, orthogonal transform coding, such as discrete cosine transform (hereinafter referred to as DCT), is performed on each of the blocks. The obtained coefficients of transform are quantized or entropy coded.

Since coding is performed for each block in the above-described coding method, when errors occur in the coded data during the reproduction of an image signal, coding errors are generated that affect entire blocks. Further, since variable-length codes are frequently used, a decoding error spreads over a plurality of blocks, thus enlarging a deterioration in the image quality. In the case of such a decoding error, if there are data that cannot be corrected by the error correction process, these data are interpolated, as non-correctable error data (hereinafter referred to as error data), using the data of a block located close thereto in terms of time and space.

To interpolate the image data of a block (hereinafter referred to as an error block) containing such error data, conventionally it has often been practiced to selectively employ inter-frame interpolation and intra-field interpolation. That is, whether there is a moving image in an error block is determined by obtaining an inter-frame correlation (which is the result of the intra-block addition of differential absolute values between the pixels of the present frame and the pixels of the preceding frame) of the image data of blocks above and below a drop-out (i.e., error) block. If there is a moving image, intra-field is selected. If there is no moving image, interframe interpolation is selected.

However, in the above-described type of interpolation, if there is an error in determining as to whether there is a moving image in the error block, i.e., if a moving image is erroneously not detected, interpolation is performed using pixel data which is less correlated to the pixel block to be interpolated, thus deteriorating the quality of a reproduced image.

SUMMARY OF THE INVENTION

A primary object of the present invention is to provide an image reproducing apparatus which can overcome the aforementioned problems of the prior art.

A second object of the present invention is to provide an image reproducing apparatus which enables deterioration in the quality of an image to be prevented even when a less correlated image signal which cannot be decoded is replaced with another image signal.

To achieve the above-described objects, a first aspect of the present invention provides an image reproducing apparatus including reproduction means for reproducing an image signal corresponding to a picture having a plurality of image blocks that each comprise a plurality of pixels, the image signal including coded image data for each of the image blocks. Decoding means decodes the image signal reproduced by the reproducing means and replacement means replaces, with a predetermined signal, a portion of the image data for blocks located near an undecodable block, the undecodable block being a block corresponding to image data that cannot be decoded by said decoding means.

According to another aspect, the present invention provides an image reproducing apparatus including reproducing means for reproducing an image signal corresponding to a picture having a plurality of image blocks that each comprise a plurality of pixels, the image signal including coded image data for each of the image blocks. Decoding means decodes the image signal reproduced by the reproducing means and modification means modifies a portion of the image data for blocks located near an undecodable block, the undecodable block being a block corresponding to image data that cannot be decoded by the decoding means, in accordance with a distance between the undecodable block and each respective block for which image data is modified.

According to still another aspect, the present invention provides an image processing device including input means for inputting an image signal corresponding to a picture having a plurality of image blocks that each comprise a plurality of pixels, the image signal including image data for each of the image blocks. Modification means modifies a portion of the image data for blocks located near a noncredible block, the noncredible block being a block corresponding to noncredible image data and control means controls the modification means to modify image data for a respective block in accordance with a distance between the respective block and the noncredible block.

According to yet another aspect, the present invention provides an image processing device including input means for inputting an image signal corresponding to a picture having a plurality of image blocks that each comprise a plurality of pixels, the image signal including image data for each of the image blocks. Replacement means replaces, with a predetermined signal, a portion of the image data for blocks located near a noncredible block, the noncredible block being a block corresponding to noncredible image data.

According to still a further aspect, the present invention provides an image signal processing device including input means for inputting an image signal corresponding to a picture having a plurality of image blocks that each comprise a plurality of pixels, the image signal including image data for each of the image blocks. Generation means generates a concealing block to conceal image data corresponding to a portion of the image blocks and replacement means replaces a portion of the concealing block with a predetermined signal.

According to yet a further aspect, the present invention provides an image signal processing device including input mean for inputting an image signal corresponding to a picture having a plurality of image blocks that each comprise a plurality of pixels, the image signal including image data for each of the image blocks. Concealing means conceals image data corresponding to at least one of the image blocks and removal means removes high-frequency components of each concealed block, a concealed block being a block corresponding to image data concealed by the concealed means.

According to still another aspect, the present invention provides an image processing device including input means for inputting an image signal corresponding to a picture having a plurality of image blocks that each comprise a plurality of pixels, the image signal including image data for each of the image blocks. Concealing means conceals image data corresponding to at least one of the image blocks and removal means removes high-frequency components of a plurality of blocks located near each concealed block, a concealed block being a block corresponding to concealed image data.

Other objects and advantages of the invention will become apparent during the following discussion of the accompanying drawings.

DETAILED DESCRIPTION OF THE PREFERRED EMBODIMENTS

An embodiment of the present invention will be described below with reference to the accompanying drawings.

Figure 1:
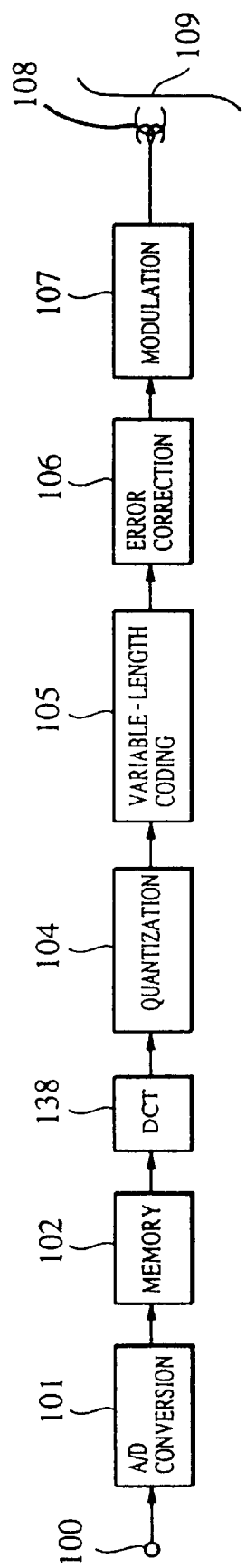
FIG. 1 is a block diagram illustrating the structure of a recording system for a digital VTR according to the present invention.

First, the recording operation of a digital VTR according to the present invention, will be described. FIG. 1 is a block diagram illustrating the structure of a recording system of a digital VTR.

In FIG. 1, an A/D converter 101 converts image data input from an input terminal 100 in the form of an analog signal into a digital signal, and writes the converted data in a memory 102. The memory 102 has a capacity corresponding to at least two frames. In the memory 102, writing and reading are performed alternately for each frame.

The image data written in the memory 102 is read in blocks each having dimensions of 8 pixels×8 pixels, and output to a DCT circuit 103. The DCT circuit 103 performs DCT on the image data for every block to convert the data of a spatial area into the data of a frequency area, and outputs 64 coefficients of DCT, consisting of 8 coefficients of DCT×8 coefficients of DCT, for each block.

Generally, moving picture signals, such as video signals, show excellent correlation between screens. Thus, when such moving picture signals are converted into the data of the frequency area by performing DCT thereon, the components of respective blocks can be collected in the low frequency area. Further, since a human being's eyes are visually insensitive to the high frequency area, quantization of such a high frequency area at a rough step does not noticeably deteriorate the image quality. A quantization circuit 104 utilizes these facts and quantizes the coefficients of DCT supplied from the DCT circuit 103 in every 64 coefficients of DCT at a step which increases in proportion to the frequency.

A variable length coding circuit 105 variable-length codes the data output from the DCT circuit 104 by allocating variable length codes thereto. The variable-length coded data obtained by the variable-length coding circuit 105 is error correction coded by an error correction circuit 106. A modulating circuit 107 performs modulation suited to magnetic recording on the error correction coded data, and a recording/reproducing circuit 108 records the modulated data on a magnetic tape 109.

Figure 2:
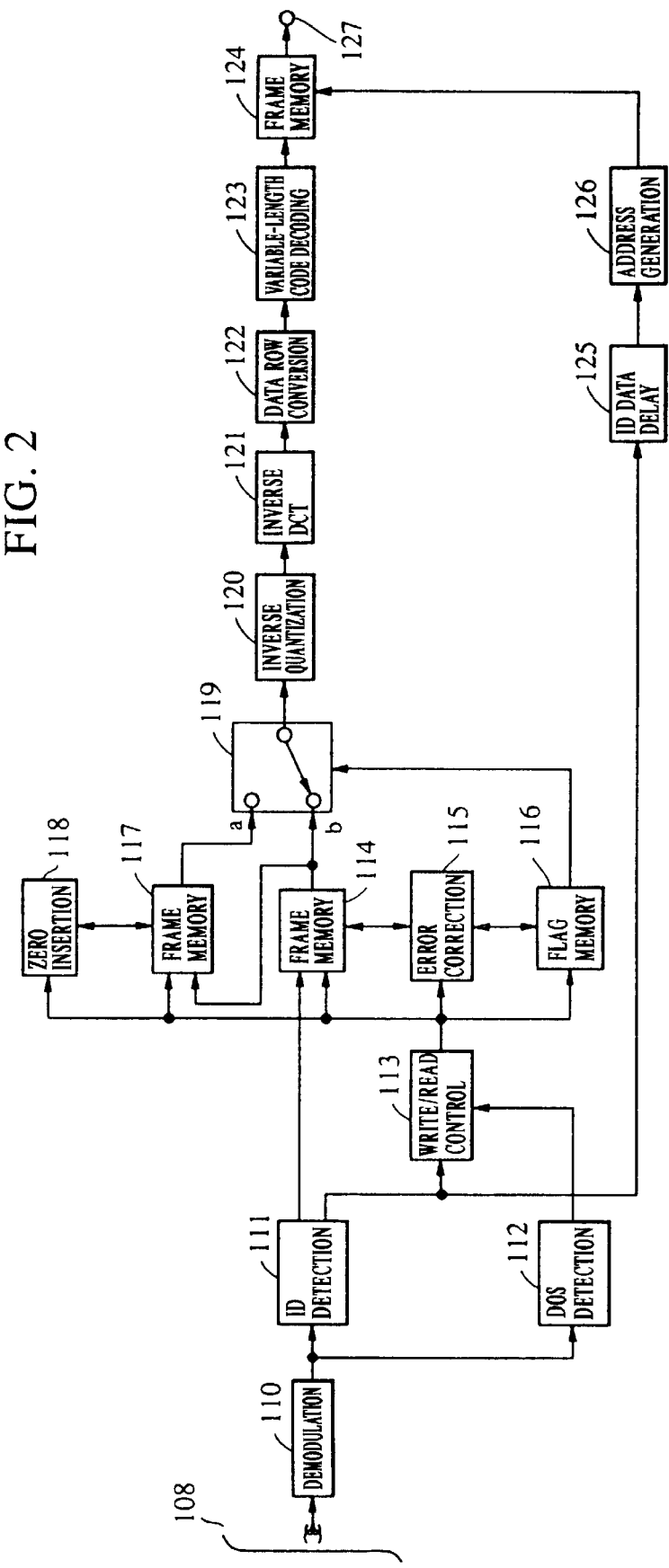
FIG. 2 is a block diagram illustrating the structure of a reproducing system for a digital VTR according to a first embodiment of the present invention.

The operation of a reproducing system of the digital VTR, which is the first embodiment of the present invention, will be described below. FIG. 2 is a block diagram illustrating the structure of the reproducing system of the digital VTR.

In FIG. 2, a demodulating circuit 110 performs demodulation corresponding to the modulation performed for recording on an image signal reproduced by the recording/ reproducing circuit 108, and outputs the demodulated image signal to an ID detection circuit 111 and a DOS detection circuit 112. The ID detection circuit 111 separates the input image signal into attribute data (hereinafter referred to as ID data) contained in the image signal to indicate the position of a block on the screen and image data, and outputs the separated data for each block. The DOS detection circuit 112 measures the proportion of a drop-out signal contained in the image signal by comparing an envelope of a reproduced image signal with a predetermined fixed threshold value, and outputs it in the form of a drop-out signal (hereinafter referred to as a DOS) to a subsequent write/read circuit 113. At that time, DOS has a high level signal "1" when the proportion of the drop-out signal in the measured signal is small, i.e., when the signal is reliable, and has a low level signal "0" when the proportion is large, i.e., when the signal is not reliable or noncredible.

The ID data from the ID detection circuit 111 is input to write/read control circuit 113. The write/read control circuit 113 writes the image data output from the ID detection circuit 111 in a frame memory 114 in error correction coded blocks on the basis of the contents of the ID data. Writing is performed only when DOS has a high level "1", i.e., when it is determined that the data is reliable. The write/read control circuit 113 also controls write/read of data in and from a flag memory 116 and a frame memory 117.

The input image data is the data on which DCT has been performed, i.e., which relates to the spatial frequency of the image data in an original image. An error correction circuit 115 performs error correction on the image data input in the frame memory 114 on the basis of the error correction code added to the image data, and writes the error corrected image data in the frame memory 114 again. After error correction by the error correction circuit 115 has been performed, an error flag having a high level "1" is output to a flag memory 116 for the data which could not be error corrected, while an error flag having a low level "0" is output to the flag memory 116 for the data which is free from errors or which has been error corrected.

The error corrected image data output from the frame memory 114 is input to the frame memory 117 composed of a group of addressable memories, such as random access memories (hereinafter referred to as RAMS). In the frame memory 117, image data corresponding to a single frame is stored. The image data stored in the frame memory 117 is read into a zero insertion circuit 118 in blocks so that the high frequency components of the coefficients of DCT in each block are replaced with 0 in the manner which will be described later. The replaced data is written in the frame memory 117 again in blocks. Consequently, the image data output from the frame memory 117 is the data which has been one frame delayed with respect to the image data output from the frame memory 114.

The error flag output from the flag memory 116 is an error flag for the block containing the image data output from the frame memory 114. A switch 119 is connected to a terminal 'a' if the error flag output from the flag memory 116 has a high level "1", and to a terminal 'b' if the error flag has a low level "0", whereby inter-frame interpolation is performed using the data output from the frame memory 117 when the data output from the frame memory 114 is error data. In other words, the error data is concealed by using other data.

The output data of the switch 119 is input from the frame memories 114 and 117 in blocks to an inverted quantization circuit 120. The inverted quantization circuit performs inverted quantization on the input data. An inverted DCT circuit 121 performs inverted DCT on the data input thereto from the inverted quantization circuit 120 to convert the data of the frequency area into the data of the space area. At that time, since the high frequency components of the block on which inter-frame interpolation has been performed due to the data errors has been replaced with 0, they are converted into pixel data representing a soft image containing no high frequency component.

The output of the inverse DCT circuit 121 is a data row which is arranged in order of frequency, i.e., which is scanned in a zigzag fashion. A data row conversion circuit 122 rearranges the zigzag scanned data row in the order of scanning on a screen in blocks, and outputs the results to a variable-length code decoding circuit 123. The variable-length code decoding circuit 123 decodes the image data according to the variable-length code allocated during recording, and outputs the decoded image data to a frame memory 124.

An ID data delay circuit 125 delays the time at which the ID data of the pixel block of the data row is output from the DOS detecting circuit and thereby synchronizes the output of the data row from the data row converting circuit 122 with the output of the ID data of the pixel block of that data row. An address generating circuit 126 controls the address of the frame memory 124 on the basis of the ID data output from the ID data delay circuit 125 to write the data output from the data row converting circuit 122 in the frame memory 124 in the order of scanning of one frame. The address generating circuit 126 also controls the reading address of the frame memory 124 to read the image data in order of scanning. The image data read is output to an external circuit from an output terminal 127.

Figure 3:
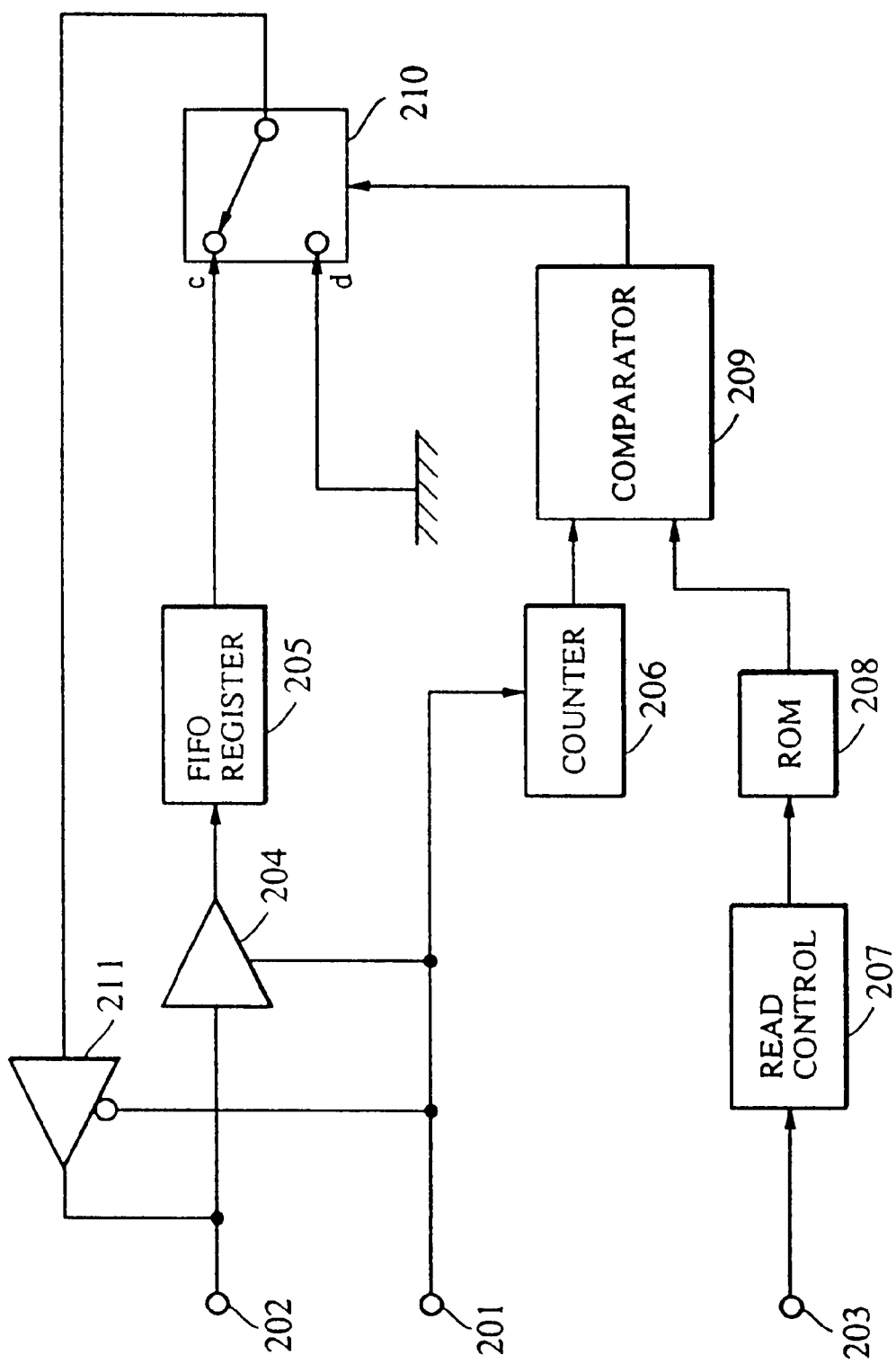
FIG. 3 is a block diagram of a zero insertion circuit shown in FIG. 2.

The operation of the zero insertion circuit 118 will now be described with reference to FIG. 3. FIG. 3 is a block diagram illustrating the structure of the zero insertion circuit 118.

In FIG. 3, a control signal is input to a terminal 201 from the write/read control circuit 113, and image data is input to a terminal 202 from the frame memory 117. The input of data to the terminal 202 is performed in units of 64 data values (coefficients of DCT) when a block consists of 8 pixels×8 pixels, as mentioned above.

When the image data input from the terminal 202 is received by a first three-state buffer (hereinafter referred to as a TSB) 204, a control signal input to the terminal 201 is at a high level "1". The first TSB 204 outputs the image data input to the terminal 202 to a first-in first-out (hereinafter referred to as a FIFO) register 205 without changing it. At that time, the output impedance of a second TSB 211 is high, and the second TSB 211 is isolated from the terminal 202.

The FIFO register 205 is capable of storing image data of one block. The write/read control circuit 113 outputs a control signal having a low level "0" to the terminal 201 when the image data of one block, i.e., 64 image data, has been read in the FIFO register 205. At that time, the output impedance of the first TSB 204 becomes high, and the output of the first TSB 204 is thereby isolated from the input of the FIFO register 205. Further, the signal output from the second TSB 211 is output to the terminal 202.

When the control signal input to the terminal 201 falls to a low level "0", a counter 206 counts the number of image data items the FIFO register 205 outputs. The FIFO register 205 outputs the same number of data items as the number of clock pulses output from a control circuit (not shown). The counter 206 counts the number of data items the FIFO register 205 outputs by counting the number of these pulses.

A comparator 209 compares the output of the counter 206 with the data output from a ROM 208. The write/read control circuit 113 outputs a control signal to an input terminal 203 in response to the initiation of counting by the counter 206. A read control circuit 207 reads out a predetermined comparative value from the ROM 208 according to the control signal from the input terminal 203, and outputs the comparative value to the comparator 209. The comparator 209 outputs a signal having a high level "1" when the output value of the counter 206 is larger than the output value of the ROM 208, and outputs a signal having a low level "0" when the output value of the counter 206 is smaller than the output value of the ROM 208. The data of a block is input to the terminal 202 in order, starting with the lowest frequency and increasing thereupon. Thus, in the data output from the FIFO register 205, the data output towards the end of the block have relatively high frequencies. Hence, a value close to 64, e.g., 53, is stored in the ROM 208 as the comparative value. That is, in the data output from the FIFO register 205, the image data having high frequencies are the 54th and subsequent data values.

A switch 210 is connected to a terminal 'c' when the output of the comparator 209 is "0", and to a terminal 'd' when the output of the comparator 209 is "1", whereby the image data values in the image data values output from the FIFO register 205 corresponding to higher frequencies, i.e., having a FIFO register position higher than the comparative value read from the ROM 208, are replaced with 0.

As mentioned above, in this embodiment, the high frequency components in an error block are replaced with a signal having a zero level. Accordingly, the image of that error block is displayed in a soft tone, eliminating a sense of incompatibility between the error block and the blocks surrounding the error block and thus making an image of an interpolated block visually inconspicuous.

In this embodiment, since the image data to be stored in the frame memory employed for interpolation is high-efficiency coded, the capacity of the frame memory can be reduced, thus reducing production cost.

In this embodiment, a comparative value of 53 is stored in the ROM 208 in the zero insertion circuit 118. However, many comparative values may be stored so that they can be selectively read out according to, for example, a distribution of the frequency data in a block.

A second embodiment of the present invention will be described below with reference to FIGS. 4 through 6. Identical reference numerals in these figures to those used in the first embodiment represent similar or identical elements, and description thereof is omitted.

In this embodiment, an intra-field interpolation is employed on the basis of moving image data of an error block in addition to the aforementioned inter-frame interpolation.

Figure 4:
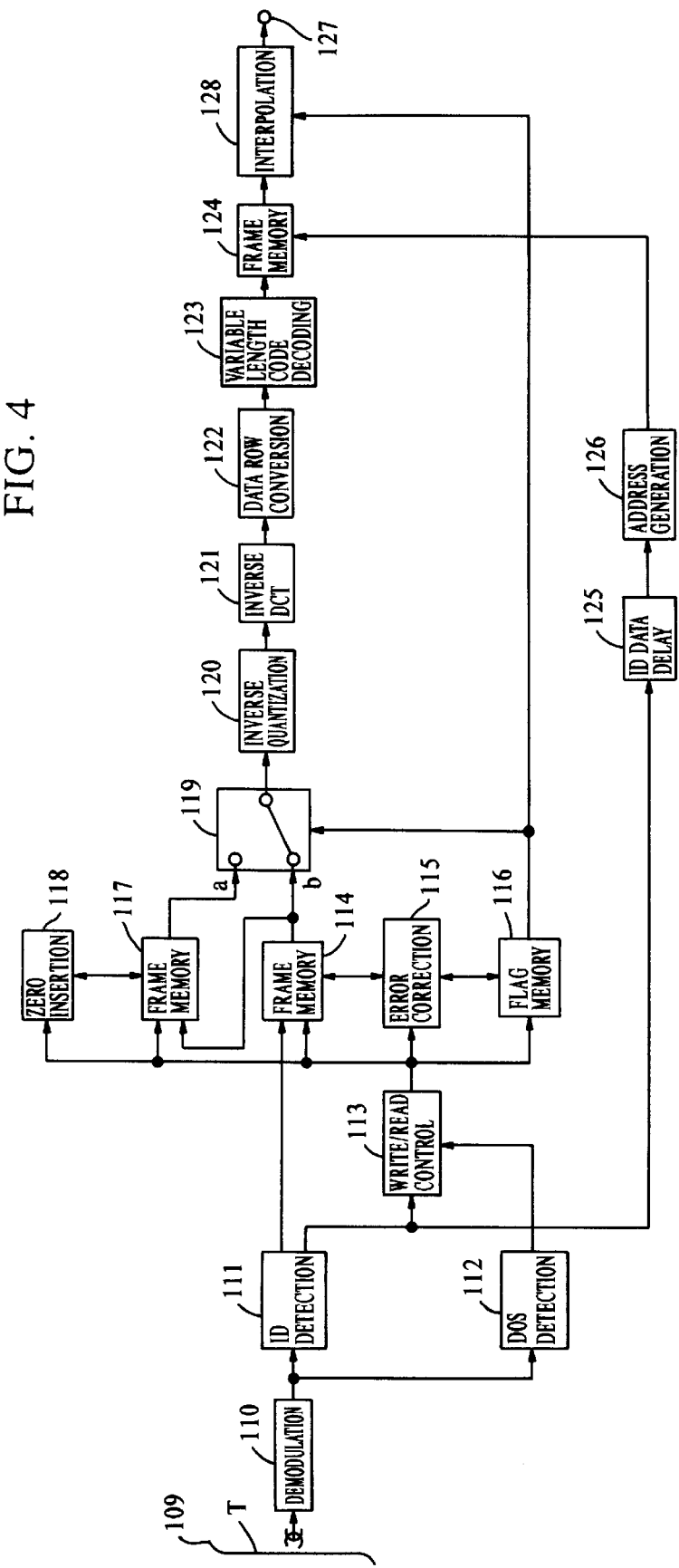
FIG. 4 is a block diagram illustrating the structure of a reproducing system for a digital VTR according to a second embodiment of the present invention.
Figure 5:
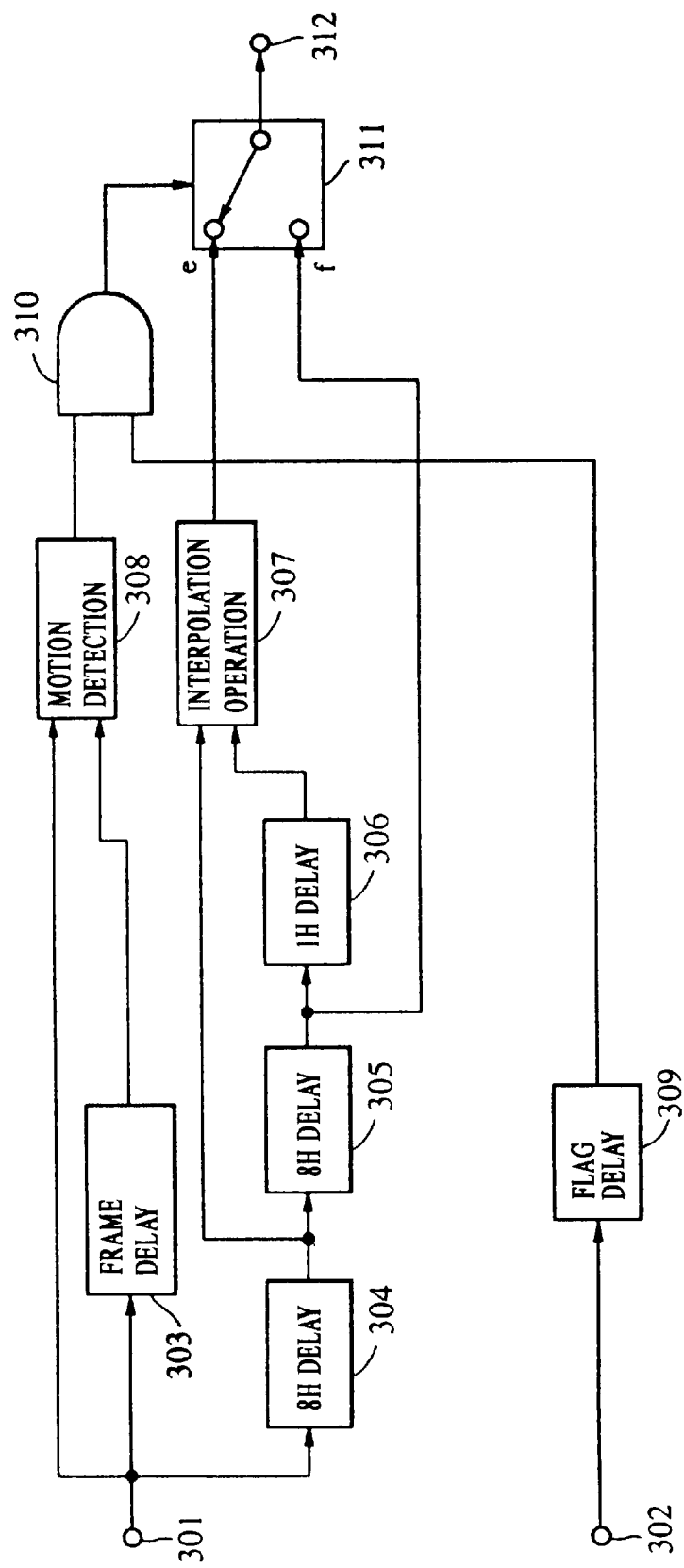
FIG. 5 is a block diagram illustrating the structure of an interpolating circuit shown in FIG. 4.

In FIG. 4, an interpolation circuit 128 switches over interpolation of an error block between inter-frame interpolation and intra-frame interpolation on the basis of the output of a motion detecting circuit in the interpolation circuit 128.

The operation of the interpolation circuit 128 will be described with reference to FIG. 5. It is assumed in this embodiment that a pixel block consists of 8 pixels and 8 pixels, as in the aforementioned embodiment. In FIG. 5, image data is input to a terminal 301 from the frame memory 124. The input pixel data is input to both a frame delay circuit 303 and a motion detection circuit 308 for detecting a moving image of an image block. The frame delay circuit 303 delays the input image data by a time corresponding to one frame and outputs the delayed image data to the motion detection circuit 308. The motion detection circuit 308 detects a moving image of a block by integrating the absolute value of a difference between the image data from the terminal 301 and the image data output from the frame delay circuit 303 over a single block and then by comparing the integrated value with a preset comparative value. The motion detection circuit 308 outputs a high level "1" when there is a moving image, and outputs a low level "0" when there is no moving image.

Next, the intra-field interpolation operation performed in this embodiment will be described. In this embodiment, intra-field interpolation is performed in a vertical direction using the data of blocks located adjacent to an error block in the vertical direction. Hence, the image data input from the terminal 301 is delayed by times corresponding to 8H and 1H by 8H delay circuits 304 and 305 and a 1H delay circuit 306, respectively. In the image data input to an interpolation operation circuit 307, the image data output from the 8H delay circuit 304 to one of the input terminals of the interpolation operation circuit 307 are those located 8 lines below the image data output from the 8H delay circuit 305 in the vertical direction on a screen, while the image data output from the 1H delay circuit 306 to the other input terminal of the interpolation delay circuit 307 are those located 1 line above the image data output from the 8H delay circuit 305 in the vertical direction on a screen. In other words, the interpolation operation circuit 307 receives the image data of the lines located closest to an error block in the blocks located adjacent to the error block in the vertical direction of the same field as the field of the error block. The interpolation operation circuit 307 calculates the intra-field interpolating data in the vertical direction from the two input image data values, and outputs the calculated data to a terminal 'e' of a switch 311.

When the error flag output from a flag delay circuit 309 is at a high level "1", the image data output from the 8H delay circuit 305 are those which have already been inter-frame interpolated by the frame memory 117. The output of the 8H delay circuit 305 is connected to a terminal 'f' of the switch 311.

The data output from an AND circuit 310 assumes "1" when the motion data output from the motion detection circuit 308 assumes "1" and when the error flag output from the flag delay circuit 309 assumes "1". When the signal output from the AND circuit 310 has "1", the switch 311 connects the terminal 'e' and thereby outputs the intra-field interpolated data which has been input from the interpolation operation circuit 307. When the signal output from the AND circuit 310 has "0", the switch 311 connects the terminal 'f' and thereby outputs the correctly reproduced image data, i.e., the error corrected image data or the inter-frame interpolated data, which has been received from the 8H delay circuit 305. That is, when there is a moving image in the error block, the intra-field interpolated data is output, while when there is no moving image, the inter-frame interpolated data or the correct image data is directly output.

The operation of the interpolation operation circuit 307 in the interpolation circuit 128 will now be described with reference to FIG. 6. FIG. 6 is a block diagram illustrating the structure of the interpolation operation circuit 307.

Figure 6:
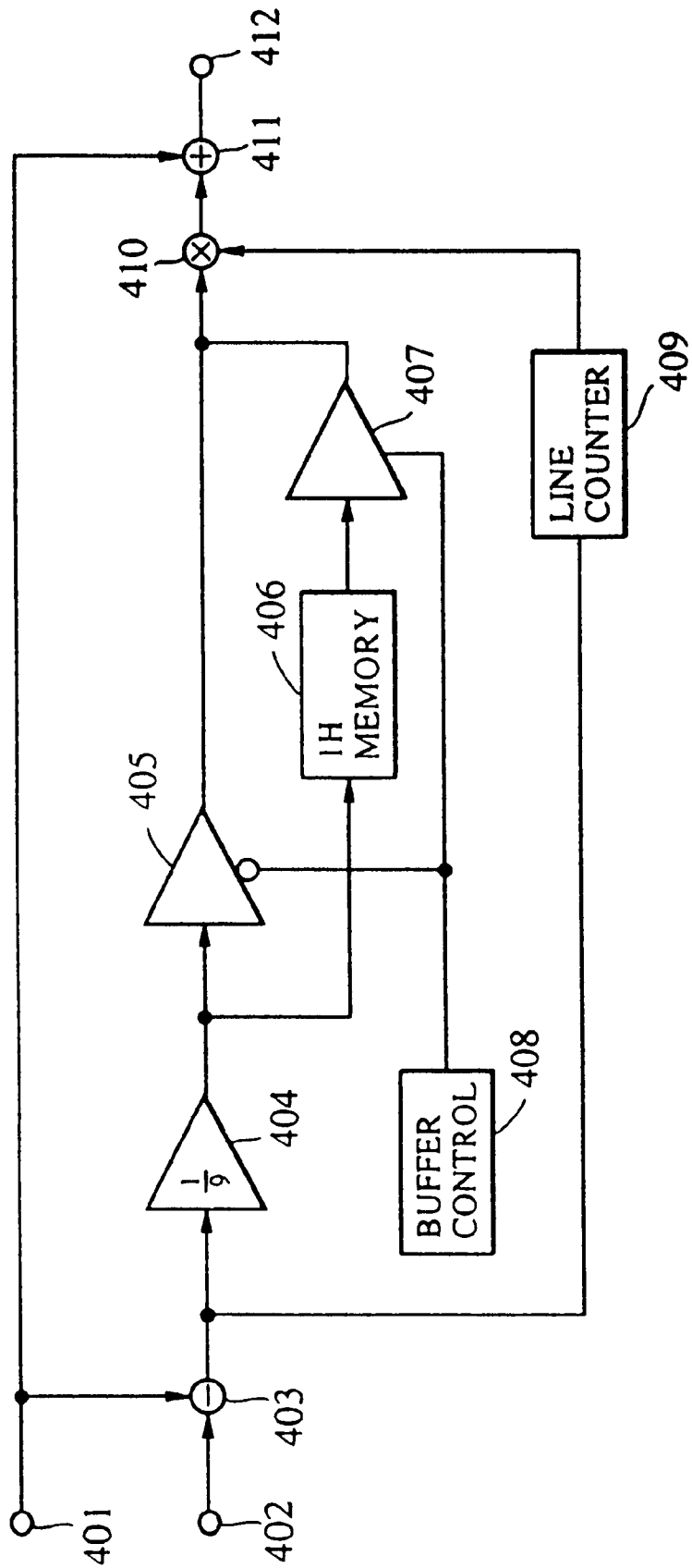
FIG. 6 is a block diagram of an interpolation operation circuit in the circuit shown in FIG. 5.

In FIG. 6, the image data of the block located above and adjacent to an error block on a screen is input to a terminal 401, and the image data of the block located below and adjacent to the error block on the screen is input to a terminal 402. A subtracter 403 calculates a difference between these input image data. A multiplier 404 reduces the obtained difference by a coefficient of 9 to calculate an increment per pixel in the vertical direction, i.e., per line, in the error block. The obtained increment is input to both a TSB 405 and a 1H memory 406.

The TSB 405 and a TSB 407 are controlled by a buffer control circuit 408. The TSB 405 outputs the input image data without changing it when the output of the buffer control circuit 408 is "0". When the output of the buffer control circuit 408 is "1", the output impedance of the TSB 405 becomes high and no image data is output therefrom. The TSB 407 outputs the input image data without changing it when the output of the buffer control circuit 408 is "1". When the output of the buffer control circuit 408 is "0", the output impedance of the TSB 407 becomes high and no image data is output therefrom.

When the first line of an error block is to be interpolated, the output of the buffer control circuit 408 assumes "0". Accordingly, the output of the multiplier 404 is output to a multiplier 410 through the TSB 405. Also, the output of the multiplier 404 is input to and stored in the 1H memory 406. When the second line through the eighth line are to be interpolated, the output of the buffer control circuit 408 assumes "1". At that time, the 1H memory 406 outputs the output of the multiplier 404 representing one line. Consequently, the output of the 1H memory 406 is output to the multiplier 410 through the TSB 407.

A line counter 409 is designed to output the currently interpolated line number, in an error block. For example, the line counter 409 outputs 4 when the fourth line in the error block is interpolated. The multiplier 410 multiplies the output of the line counter 409 by the output of the TSB 405 or 407, and an adder 411 adds the results of the multiplication to the input to the terminal 401, whereby intra-field interpolated data is generated.

In this embodiment, although intra-field interpolation is performed in the vertical direction, it may be conducted in a horizontal direction.

In this embodiment, since intra-field interpolation is also performed in addition to inter-frame interpolation conducted in the first embodiment, these interpolations can be adequately switched over according to the presence of a moving image in an error block. Further, even when a moving image is erroneously not detected and interpolation is performed using less correlated data, the interpolated block is reproduced in a soft tone, thus restricting a deterioration in the quality of an interpolated image.

A third embodiment will be described below. Identical reference numerals in the third embodiment to those in the previously described embodiments represent similar or identical elements, and description thereof is omitted.

Figure 7:
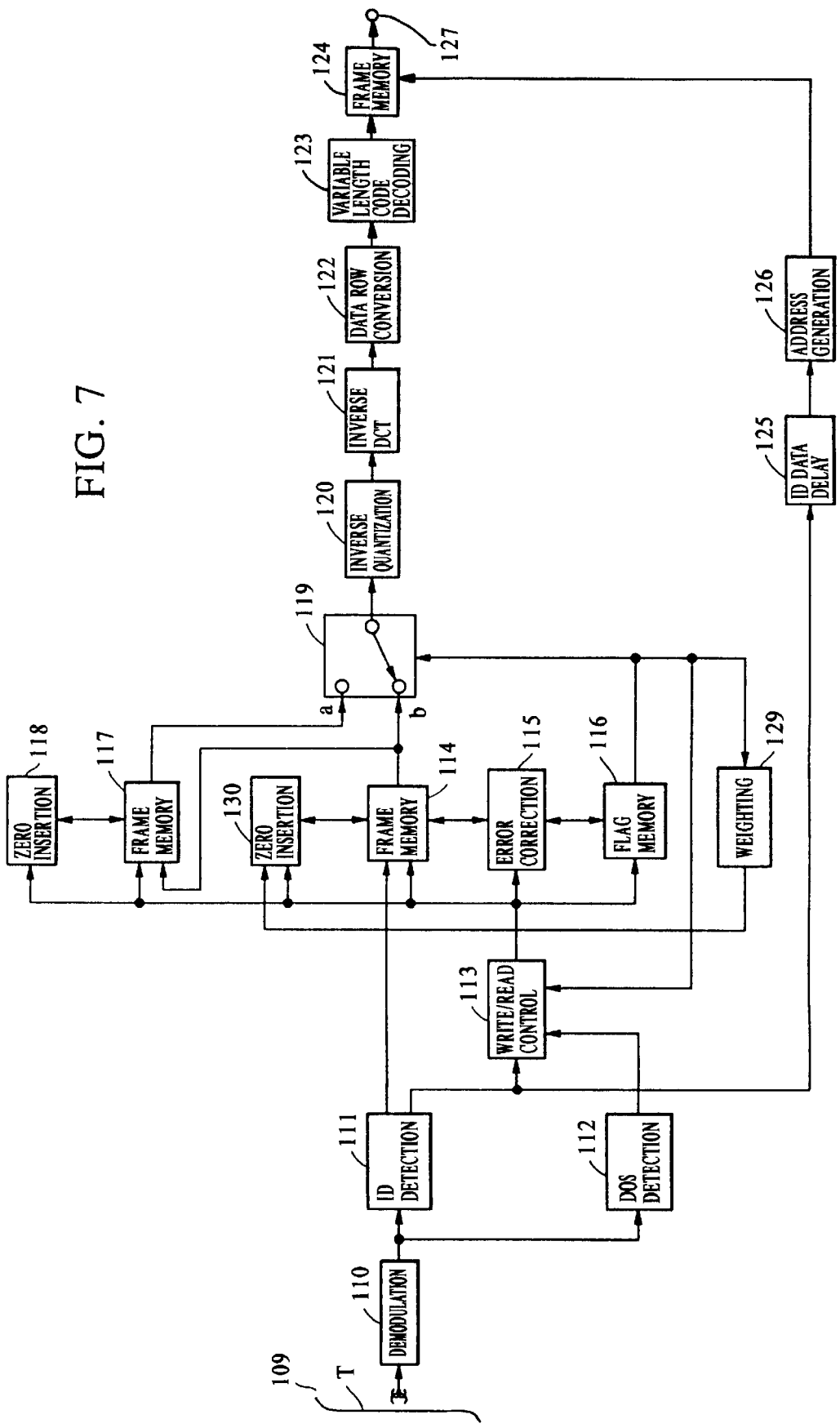
FIG. 7 is a block diagram showing the structure of a reproducing system for a digital VTR according to a third embodiment of the present invention.

FIG. 7 is a block diagram illustrating the structure of a reproducing system for a digital VTR as the third embodiment of the present invention.

In FIG. 7, the error corrected image data obtained by the error correction circuit 115 is temporarily stored in the frame memory 114. The error corrected data output from the frame memory 114 is input to and stored in the frame memory 117. As mentioned above, the image data stored in the frame memory 117 is read into the first zero insertion circuit 118 in blocks. In the read image data of each block, the high-frequency components are replaced with 0, and the replaced data is written in the frame memory 117 again for each block. Consequently, the image data output from the frame memory 117 is one frame delayed from the image data output from the frame memory 114.

The switch 119 turns on the terminal 'a' when the error flag output from the flag memory 116 has a high level "1", and turns on the terminal 'b' when the error flag has a low level "0". Consequently, when the data output from the frame memory 114 is error data, inter-frame interpolation is performed using the data output from the frame memory 117.

In this embodiment, the error flag output from the flag memory 116 is also input to the write/read control circuit 113 and a weighting circuit 129. When the error flag from the flag memory 116 has a high level "1", the write/read control circuit 113 reads out, from the frame memory 114, the data of the blocks located around an error block in a predetermined order which will be described later, and makes a second zero insertion circuit 130 partially replace the data of these surrounding blocks with zero. At that time, in the second zero insertion circuit 130, as the distance on a screen of a block to the error block, determined by the weighting circuit 129, decreases, the frequency of the components to be replaced with 0 decreases.

The output data of the switch 119 is input from the frame memories 114 and 117 to the inverse quantization circuit 120 in blocks. The inverse quantization circuit 120 performs inverse quantization on the input data. Thereafter, the inverse DCT circuit 121 performs inverse DCT on the data to convert the image data of frequency area into image data of spatial area. At that time, since the high frequency components of the block on which inter-frame interpolation has been performed due to the data error have been replaced with 0, a soft toned image containing no high frequency components can be obtained. Further, regarding the blocks located around the error block, since the frequency of the components to be replaced with 0 decreases as the distance on a screen of a block from the error block decreases, the degree of softness of an image decreases as the distance on a screen from the error block to a block increases.

The data row conversion circuit 122 rearranges the output of the inverse DCT circuit 121 for each block in the order in which they are scanned on a screen. When the rearranged data are written in the frame memory 124, they are rearranged in the order in which they are scanned in a frame. The data which has been read out from the frame memory 124 in the order in which they are scanned in a frame are output to an external circuit from the output terminal 127.

Figure 8:
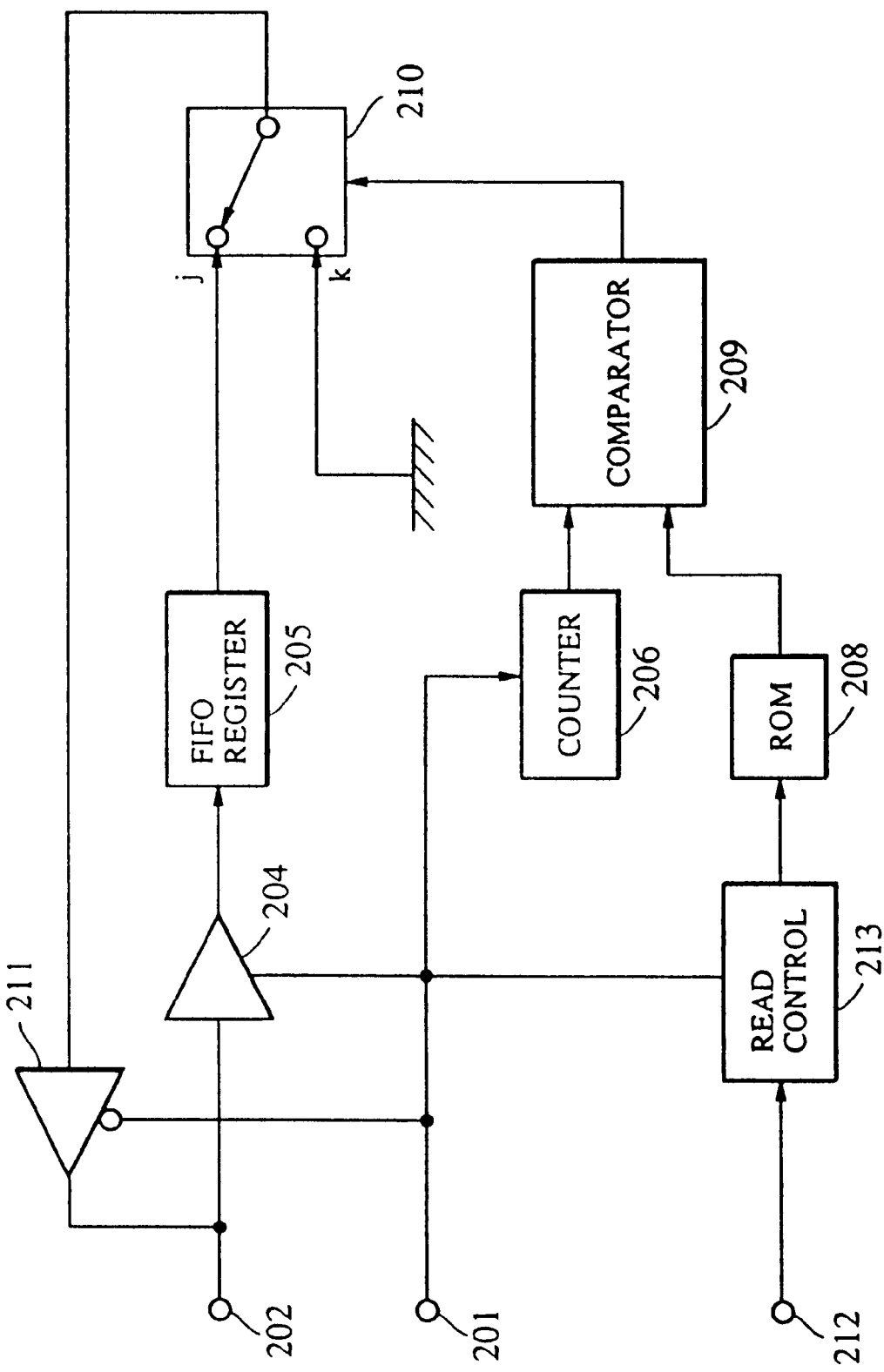
FIG. 8 is a block diagram showing the structure of a second zero insertion circuit shown in FIG. 7.

The operation of the second zero insertion circuit 130 will now be described with reference to FIGS. 8 and 9. FIG. 8 is a block diagram illustrating the structure of the second zero insertion circuit 130. Identical reference numerals in FIG. 8 to those in FIG. 3 represent elements which have the same functions as those of the elements of the first zero insertion circuit 118, and description thereof is omitted.

In the second zero insertion circuit 130, the comparative value read from the ROM 208 is changed by the data input to the terminal 202. That is, as mentioned above, the write/read control circuit 113 inputs the data of the plurality of blocks located around an error block to the second zero insertion circuit 130. Read out of these peripheral blocks from the frame memory 114 is performed in a predetermined order. The read control circuit 213 reads a plurality of comparative values from the ROM 208 corresponding to the predetermined order on the basis of the control signal input to the input terminal 212 from the write/read control circuit 113.

The operation of the second zero insertion circuit 130 will be described in more detail with reference to FIG. 9. FIG. 9 shows the blocks on a screen. In FIG. 9, $B_{i,j}$, $B_{i+1,j}$ . . . in an upper portion of each block represent block numbers. 35, 42 . . . in a lower portion of each block represent the comparative values stored in the ROM 28 shown in FIG. 8. The hatched peripheral blocks are pixel blocks on which zero insertion is not performed.

Figure 9:
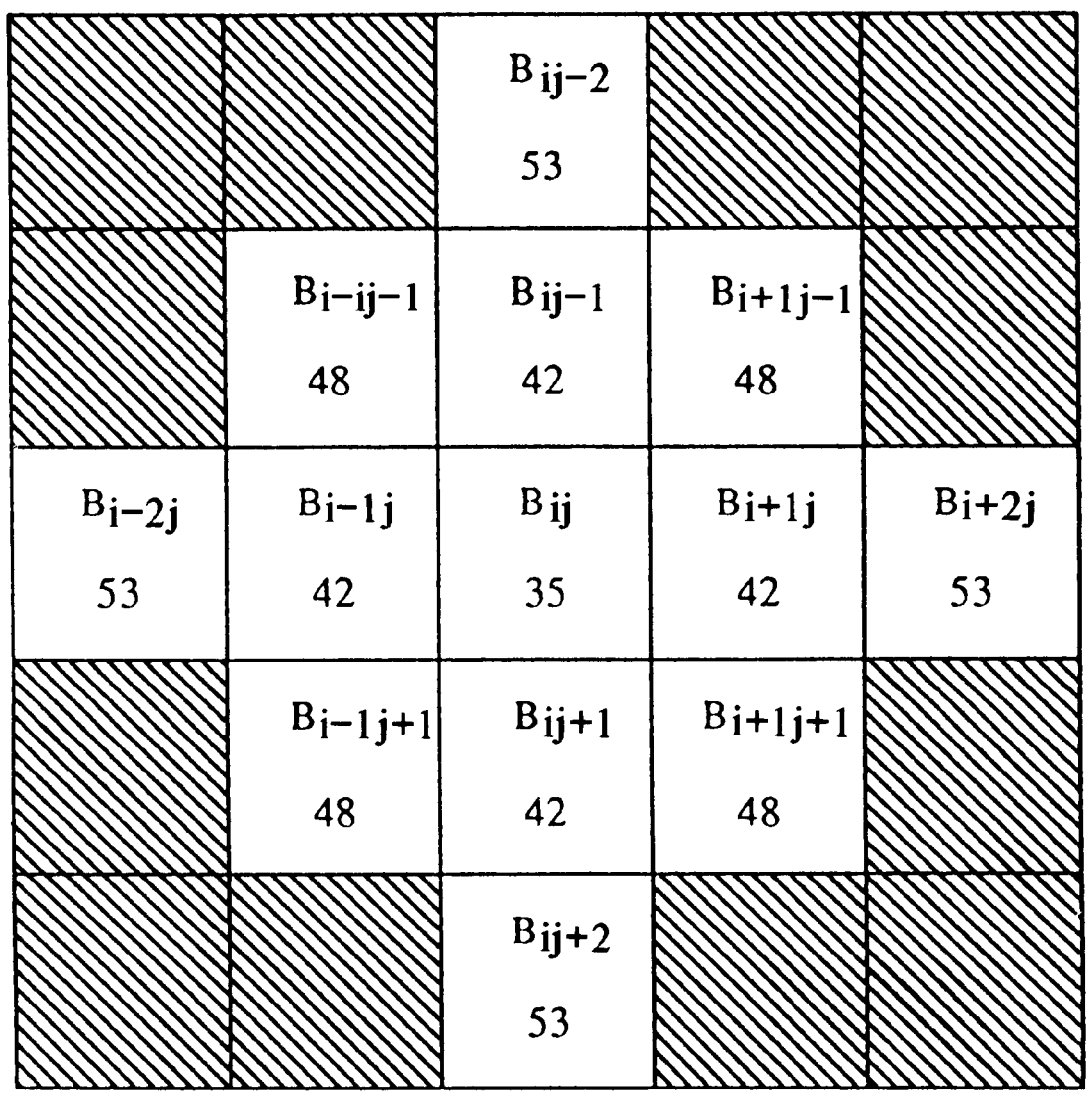
FIG. 9 illustrates the layout of blocks for explaining the operation of the second zero insertion circuit.

In FIG. 9, it is assumed that block $B_{i,j}$ is an error block. Inter-frame interpolation is performed on error block $B_{i,j}$ using the data of the block located at the same position on a screen of a previous frame. The data of the block located at the same position in the previous frame as the block $B_{i,j}$ is read from the frame memory 117 to the first zero insertion circuit 118. At that time, the comparative value 35 is present in the ROM 208 in the first zero insertion circuit 118. The first zero insertion circuit 118 replaces the 36th and subsequent data in the block located at the same position in the previous frame as that of the block $B_{i,j}$ with 0 according to the aforementioned operation.

The data of the blocks located around the block $B_{i,j}$ are read from the frame memory 114 to the second zero insertion circuit 130 in an order which will be described later. That is, the data of the pixel blocks are read into the second zero insertion circuit in order of block $B_{i,j-1}$, $B_{i-1,j}$, $B_{i+1,j}$, $B_{i,j+1}$, $B_{i-1,j-1}$, $B_{i+1,j-1}$, $B_{i-1,j+1}$, $B_{i+1,j+1}$, $B_{i,j-2}$, $B_{i-2,j}$, $B_{i+2,j}$, $B_{i,j+2}$. The read control circuit 213 of the second zero insertion circuit 130 controls reading of the ROM 208 on the basis of both the control signal output from the write/read control circuit 113 and the error flag output from the flag memory 116 such that a comparative value 42 is output from the ROM 208 when the data of the blocks $B_{i,j-1}$, $B_{i-1,j}$, $B_{i+1,j}$ and $B_{i,j+1}$ are read in, that a comparative value 48 is output when the data of the blocks $B_{i-1,j-1}$, $B_{i+1,j-1}$, $B_{i-1,j+1}$ and $B_{i+1,j+1}$ are read in, and that a comparative value 53 is output from the ROM 208 when the data of the blocks $B_{i,j-2}$, $B_{i-2,j}$, $B_{i+2,j}$ and $B_{i,j+2}$ are read in. The second zero insertion circuit 130 replaces the data in a position equal to the comparative value corresponding to each of the blocks shown in FIG. 9 and subsequent data with 0.

As mentioned above, since the data of an error block and those of the blocks located around the error block contain no high frequency component, they are displayed in a soft tone. Non-continuity of the images of the blocks located around the error block is alleviated, and a deterioration in the image can be made visually inconspicuous.

In this embodiment, the comparative value stored in the ROM 208 of the first zero insertion circuit 118 is not limited to 35. Many comparative values may be stored so that they can be selectively read out according to, for example, a distribution of the frequency components in a block.

Figure 10:
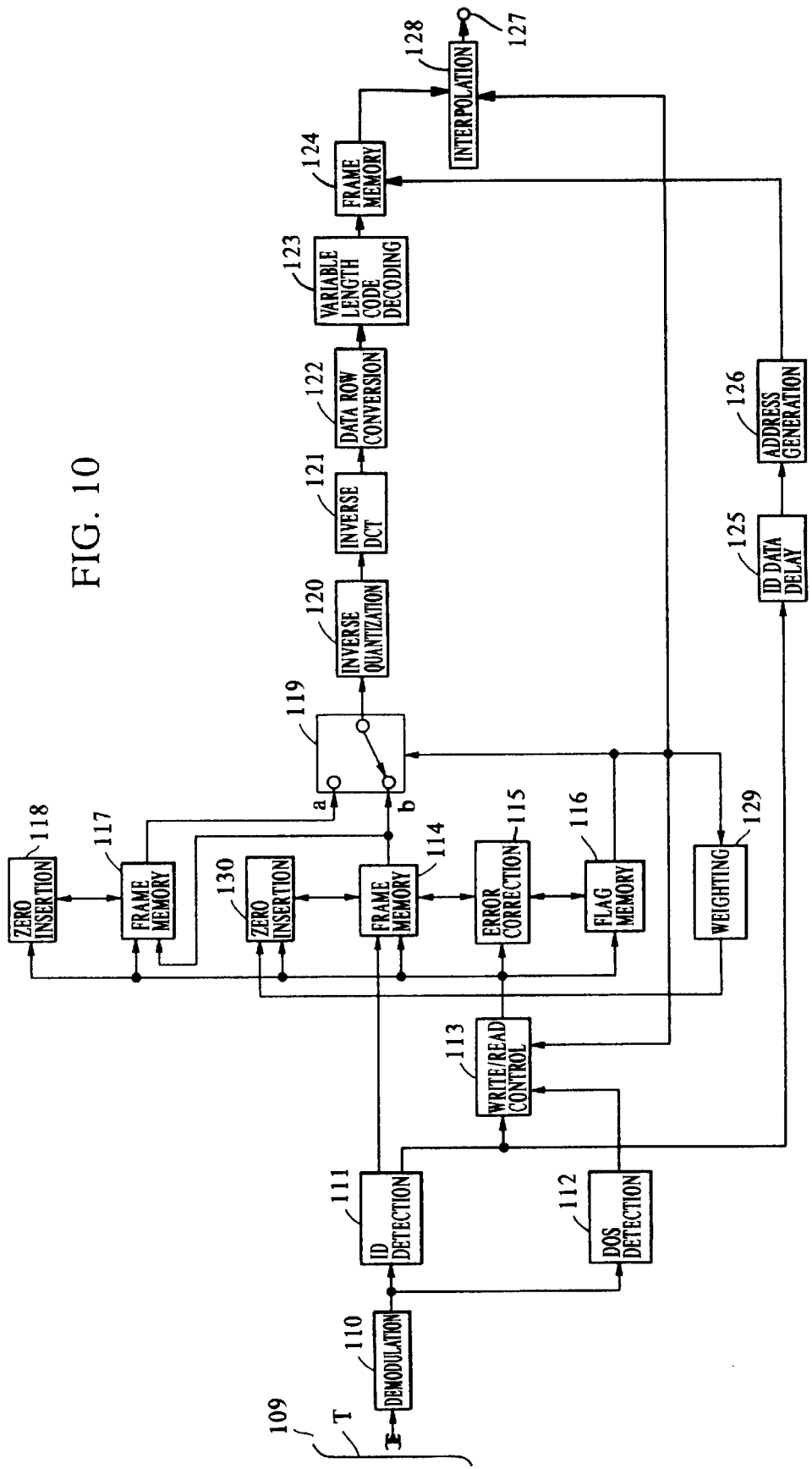
FIG. 10 is an illustration of a digital VTR according to a fourth embodiment of the present invention.

FIG. 10 illustrates the structure of a reproducing system of a digital VTR according to a fourth embodiment of the present invention.

In the apparatus shown in FIG. 10, the structure of the apparatus is the same as that of the third embodiment except that the interpolation circuit 128 is provided after the frame memory 124 so that the interpolation methods can be switched over according to a moving image in of an error block, as in the case of the second embodiment. In this way, even when the image data of an error block is restructured by performing interpolation using the image data less correlated to the image data of the error block, both the image of the error block and the images of the blocks located around the error block can be displayed in a soft tone. Non-continuity between the image of the error block and the images of the blocks located around the error block can be further alleviated, and a deterioration of the quality of a reproduced image can be prevented.

Regarding the intra-field interpolated data, the high-frequency components thereof in the vertical direction are already scarce. Thus, even if the high-frequency components are not replaced with 0, an image is displayed in a soft tone to a certain extent. Thus, in this embodiment, non-continuity between the data of the error block and the data of the blocks located around the error block can be reduced regarding the intra-field interpolated data, as in the case of the inter-frame interpolated data.

In each of the above-described embodiments, the high-frequency components of the error block or of the blocks located around the error block are replaced with 0. However, they may be replaced with a signal having a predetermined level according to, for example, the layout of the frequency components in each block.

The individual components shown in outline or designated by blocks in the drawings are all well-known in the image processing arts and their specific constructions and operation are not critical to the operation or best mode for carrying out the invention.

While the present invention has been described with respect to what are presently considered to be the preferred embodiments, the invention is not limited to the disclosed embodiments. The invention encompasses various modifications and equivalent arrangements included within the spirit and scope of the appended claims. The scope of the following claims is to be accorded the broadest interpretation so as to encompass all such modificatins and equivalent structures and functions.

What is claimed is:

1. An image signal processing device, comprising:
   input means for inputting an image signal which is divided into a plurality of blocks each of which comprises a plurality of pixels and which is transformed by orthogonal transformation in the block units;
   error correcting means for correcting errors in the input image signal;
   concealing means for concealing blocks having the errors which cannot be corrected by said error correction means by using other blocks of the input image signal; and
   replacing means for counting orthogonal transformation coefficients of blocks concealed by said concealing means to replace the orthogonal transformation coefficients in predetermined positions of the blocks concealed by said concealing means with a predetermined value according to the counted result.

2. A device according to claim 1, wherein is block coded using an orthogonal transform, and wherein said replacing means comprises a replacing circuit for converting coefficients of the orthogonal transform of the high-frequency components of each concealed block to the predetermined value.

3. A device according to claim 2, wherein the predetermined value is zero.

4. An image signal processing device according to claim 2, wherein said replacing means replaces the high-frequency components of the blocks of image data corresponding to a previous picture for each concealed block.

5. An image processing device, comprising:
   input means for inputting an image signal which is divided into a plurality of blocks each of which comprises a plurality of pixels and which is transformed by orthogonal transformation in the block units;
   error correcting means for correcting errors in the input image signal;
   concealing means for concealing blocks having the errors which cannot be corrected by said error correction means by using other blocks of the input image signal; and
   replacing means for counting orthogonal transformation coefficients of blocks surrounding a block concealed by said concealing means on a picture screen to replace the orthogonal transformation coefficients in predetermined positions of the blocks surrounding the block concealed by said concealing means according to the counted result.

6. A device according to claim 5, wherein said replacing means comprises a replacing circuit for converting coefficients of the orthogonal transform of the high-frequency components of each concealed block to the predetermined value.

7. A device according to claim 6, wherein the predetermined value is zero.

8. An image signal processing device according to claim 5, wherein said replacing means replaces the high-frequency components of the blocks of image data corresponding to a previous picture for each concealed block.

9. A device according to claim 5, further comprising control means for controlling said replacing means according to a distance between the block concealed by said concealing means and the blocks surrounding the block concealed by said concealing means.

10. An image processing apparatus comprising:
    input means for inputting an image signal which is divided into a plurality of blocks each of which comprises a plurality of pixels and is transformed by orthogonal transformation in the block units;
    error correcting means for correcting errors in the input image signal;

concealing means for concealing blocks having the errors which cannot be corrected by said error correction means by using other blocks of the input image signal;

replacing means for replacing orthogonal transformation coefficients of high-frequency components of blocks concealed by said concealing means with a predetermined value, said replacing means replacing the orthogonal transformation coefficients of high-frequency components of each of the concealed blocks; and inverse transformation means for inverse transforming the image signal output from said replacing means by using inverse orthogonal transformation in the block units.

11. Apparatus according to claim 10, wherein said removing means includes replacing means for converting the predetermined orthogonal transformation coefficients of the concealed blocks to a predetermined value.

12. Apparatus according to claim 11, wherein the predetermined value is zero.

13. Apparatus according to claim 11, further comprising processing means for performing inverse orthogonal transformation to restore the image signal.

14. Apparatus according to claim 10, wherein said replacing means replaces predetermined orthogonal transformation coefficients of blocks surrounding the concealed blocks on a picture screen with a predetermined value.

15. Apparatus according to claim 11, wherein said input means includes reproducing means for reproducing the image signal from a recording medium.

16. An image processing apparatus comprising:

input means for inputting an image signal which is divided into a plurality of blocks each of which comprises a plurality of pixels and is transformed by orthogonal transformation in the block units;

error correcting means for correcting errors in the input image signal;

concealing means for concealing blocks having the errors which cannot be corrected by said error correction means by using other blocks of the input image signal;

replacing means for replacing orthogonal transformation coefficients of high-frequency components of blocks concealed by said concealing means with a predetermined value, said replacing means replacing the orthogonal transformation coefficients of high-frequency components of each of the concealed blocks.

17. An image processing apparatus comprising:

input means for inputting image data which is divided into a plurality of blocks and coded in block units;

error correcting means for correcting errors in the input image data;

concealing means for concealing blocks having errors which cannot be corrected by said error correcting means by using other blocks;

discriminating means for receiving the image data from said concealing means and discriminating whether an amount of image data of the concealed blocks reaches a predetermined amount; and replacing means for replacing the image data exceeding the predetermined amount in the concealed blocks with predetermined data, wherein said replacing means operates according to a result of discrimination of each of the concealed blocks by said discriminating means.

18. Apparatus according to claim 17, wherein the input image data comprise image data transformed by orthogonal transformation in block units, and wherein said replacing means replaces the image data with data representing orthogonal transformation coefficients of a predetermined value.

19. Apparatus according to claim 18, wherein said predetermined value is zero.

20. Apparatus according to claim 17, wherein said input means includes reproducing means for reproducing image data from a recording medium.

21. Apparatus according to claim 17, wherein said concealing means conceals the blocks having the errors which cannot be corrected by said error correcting means by using blocks of a previous picture.

22. Apparatus according to claim 17, wherein said error correction means generates error information indicating whether the blocks have the errors which cannot be corrected by said error correcting means, and wherein said concealing means conceals the blocks having the errors which cannot be corrected by said error correcting means according to the error information generated by said error correcting means.

23. Apparatus according to claim 17, wherein said concealing means includes memory means for storing a plurality of frames of image data, and memory control means for controlling writing and reading operations of said memory means.

24. An image processing method comprising:

an input step for inputting image data which is divided into a plurality of blocks encoded in block units;

an error correcting step for correcting errors in the input image data;

a concealing step for concealing blocks having errors which cannot be corrected by said error correcting step by using other blocks;

a discriminating step for receiving the image data from said concealing step and discriminating whether an amount of image data of the concealed blocks reaches a predetermined amount; and a replacing step for replacing the image data exceeding the predetermined amount in the concealed blocks with predetermined data, said replacing step operating in accordance with a result of the discrimination of each of the concealed blocks by said discriminating step.

25. A method according to claim 24, wherein the input image data comprise image data transformed by orthogonal transformation in the block units, and wherein said replacing step replaces the image data with data representing orthogonal transformation coefficients of a predetermined value.

26. A method according to claim 25, wherein said predetermined value is zero.

27. A method according to claim 24, wherein said input step includes a reproducing step for reproducing image data from a recording medium.

28. A method according to claim 24, wherein said concealing step conceals the blocks having the errors which cannot be corrected by said error correcting step by using blocks of a previous picture.

29. A method according to claim 24, wherein said error correcting step generates error information indicating whether the blocks have the errors which cannot be corrected by said error correcting step, and wherein said concealing step conceals the blocks having the errors which cannot be corrected by said error correcting step according to the error information generated by said error correcting step.

30. A method according to claim 24, wherein said concealing step includes the step of storing a plurality of frames of image data in a memory, and a memory control step for controlling writing and reading operations of said memory.

* * * * *

UNITED STATES PATENT AND TRADEMARK OFFICE
CERTIFICATE OF CORRECTION

PATENT NO. : 6,002,837

DATED : December 14, 1999

INVENTOR(S) : Mitsuo Niida, et al.

It is certified that error appears in the above-identified patent and that said Letters Patent is hereby corrected as shown below:

ON THE COVER PAGE
  [57] Abstract
    "nit" should read --unit--.

COLUMN 11
  Line 23, "of" should be deleted.

COLUMN 12
  Line 14, "is block" should read --each block is--.

COLUMN 13
  Line 21, "claim 11" should read --claim 10--; and
  Line 28, "claim 11" should read --claim 10--.

Signed and Sealed this

Sixth Day of February, 2001

Attest:

Q. TODD DICKINSON

*Attesting Officer*      *Director of Patents and Trademarks*